United States Patent
Santamaria-Pang et al.

(10) Patent No.: US 11,727,125 B2
(45) Date of Patent: Aug. 15, 2023

(54) EMERGENT LANGUAGE BASED DATA ENCRYPTION

(71) Applicant: GENERAL ELECTRIC COMPANY, Schenectady, NY (US)

(72) Inventors: Alberto Santamaria-Pang, Niskayuna, NY (US); Peter Henry Tu, Niskayuna, NY (US); Naresh Sundaram Iyer, Ballston Spa, NY (US); Varish Mulwad, Niskayuna, NY (US); Guangliang Zhao, Latham, NY (US)

(73) Assignee: General Electric Company, Schenectady, NY (US)

(*) Notice: Subject to any disclaimer, the term of this patent is extended or adjusted under 35 U.S.C. 154(b) by 496 days.

(21) Appl. No.: 16/835,683

(22) Filed: Mar. 31, 2020

(65) Prior Publication Data

US 2021/0303701 A1 Sep. 30, 2021

(51) Int. Cl.
*G06F 21/60* (2013.01)
*G06F 40/30* (2020.01)
*G06F 40/58* (2020.01)
*G06N 3/045* (2023.01)

(52) U.S. Cl.
CPC ............ *G06F 21/602* (2013.01); *G06F 40/30* (2020.01); *G06F 40/58* (2020.01); *G06N 3/045* (2023.01)

(58) Field of Classification Search
None
See application file for complete search history.

(56) References Cited

U.S. PATENT DOCUMENTS

| | | | |
|---|---|---|---|
| 10,510,000 B1* | 12/2019 | Commons | G06F 40/30 |
| 2014/0025952 A1* | 1/2014 | Marlow | H04L 63/0428 713/168 |
| 2014/0358256 A1* | 12/2014 | Billi | G06F 8/76 700/83 |
| 2016/0182457 A1* | 6/2016 | Karaoguz | H04N 21/632 713/153 |
| 2018/0349740 A1 | 12/2018 | Schneider et al. | |
| 2018/0359084 A1* | 12/2018 | Jain | H04L 9/08 |
| 2019/0034658 A1* | 1/2019 | Xie | H04W 12/02 |
| 2019/0080205 A1* | 3/2019 | Kaufhold | G06N 3/08 |
| 2019/0190700 A1* | 6/2019 | Hong | G06N 3/006 |
| 2019/0285517 A1* | 9/2019 | Lou | G06N 3/08 |
| 2019/0372754 A1* | 12/2019 | Gou | H04L 9/008 |
| 2019/0394171 A1* | 12/2019 | Kaman | H04L 9/12 |
| 2020/0118014 A1* | 4/2020 | Kasturi | G06N 7/005 |

(Continued)

OTHER PUBLICATIONS

Angeliki Lazaridou et al, Multi-Agent Cooperation and the Emergence of (Natural) Language, ICRL 2017. (Year: 2017).*

(Continued)

*Primary Examiner* — Howard Cortes (57) ABSTRACT

Briefly, embodiments are directed to a system, method, and article for acquiring a symbol comprising a representation of input data. The symbol may be converted into an emergent language expression in an emergent language via processing of a first neural network. Transmission of the emergent language expression may be initiated over a communications network, where the emergent language comprises a language based on and specific to the input data. The emergent language expression may be translated back into the representation of the input data via processing of a second neural network.

20 Claims, 6 Drawing Sheets

(56) References Cited

U.S. PATENT DOCUMENTS

2020/0364402 A1* 11/2020 Wilken ................ G06N 3/0445
2021/0174937 A1* 6/2021 Swisher ............... G06K 9/6232
2022/0189474 A1* 6/2022 Sharifi .................... G10L 15/30

OTHER PUBLICATIONS

Yang et al., "Novel Quantum Image Encryption using One-Dimensional Quantum Cellular Automata", Information Sciences, vol. 345, pp. 257-270, Jun. 1, 2016.
Havrylov et al., "Emergence of Language with Multi-agent Games: Learning to Communicate with Sequences of Symbols", International Conference on Learning Representations, pp. 1-11, Nov. 4, 2017.
Lee et al., "Emergent Translation in Multi-Agent Communication", International Conference on Learning Representations, Apr. 11, 2018.

* cited by examiner

FIG. 7

EMERGENT LANGUAGE BASED DATA ENCRYPTION

BACKGROUND

Encryption comprises a process of encoding a message or information in such a way that only authorized parties have an ability to access the message or information, whereas those who are not authorized cannot. Encryption may not itself prevent an entity from acquiring a particular message or item of content but may instead deny intelligible content to a would-be interceptor. In an encryption scheme, intended information or a message, e.g., referred to as plaintext, may be encrypted using an encryption algorithm, e.g., a cipher-generating ciphertext which may be read only if decrypted.

There are different methods which have been developed for encryption. One popular method for encryption is based on prime number factorization. Prime number factorization (or integer factorization) incorporates a mathematical process to secure public-key encryption systems. In one example, relatively large semi-prime numbers (e.g., the result of multiplication of two prime numbers) may be utilized as a number securing an encryption process. Accordingly, in order to break or determine original content of an encrypted message, one would need to find the prime number factorization of a large semi-prime number, e.g., two or more prime numbers which, if multiplied together, result in the original number.

Types of encryption such as prime number factorization may rely on the idea that current computers are not powerful enough to decrypt certain types of encrypted data. For example, with current computers, it might take 100 years to decrypt an encrypted message if a cipher or decryption scheme such as where a relatively large semi-prime number is required to decrypt an encrypted message if such computers are employed to successively attempt to guess the semi-prime number. Such an encryption process is based partially on the assumption that computers are not powerful enough to crack the encrypted message.

However, there is a concern that within a few years, quantum computing is coming to the industry. Quantum computers are projected to be far more efficient at performing various computations. For example, a quantum computer is projected to have an ability to perform calculations or computations in seconds which would have taken years to perform with typical computers.

There is a concern that with use of a quantum computer, there is a relatively high risk that if an encrypted communication is intercepted, the communication may be cracked. Accordingly, the design of more sophisticated mathematically models to perform encryption and decryption is therefore a concern within the field of cryptography, for example.

If encryption is performed with quantum computing, the encryption may be highly secure. However, there are certain hardware limitations as such an encryption scheme may be capable of being implemented in most computing systems, for example.

SUMMARY

According to an aspect of an example embodiment, a system may provide for secure communication. The system may include a trained agent and a trained machine translator. The trained agent may acquire a symbol comprising a representation of input data, convert the symbol into an emergent language expression in an emergent language via processing of a first neural network, and initiate transmission of the emergent language expression over a communications network. The emergent language may comprise a language based on and specific to the input data. The trained machine translator may receive the emergent language expression via the communications network and translate the emergent language expression back into the representation of input data via processing of a second neural network.

According to an aspect of another example embodiment, a method may provide for secure communication. A symbol may be acquired which comprises a representation of input data. The symbol may be converted into an emergent language expression in an emergent language via processing of a first neural network. Transmission of the emergent language expression may be initiated over a communications network. The emergent language may comprise a language based on and specific to the input data. The emergent language expression may be translated back into the representation of input data via processing of a second neural network.

According to an aspect of another example embodiment, an article may comprise a non-transitory storage medium comprising machine-readable instructions executable by one or more processors. The instructions may be executable to acquire a symbol comprising a representation of input data. The symbol may be converted into an emergent language expression in an emergent language via processing of a first neural network. Transmission of the emergent language expression may be initiated over a communications network. The emergent language may comprise a language based on and specific to the input data. The emergent language expression may be translated back into the representation of input data via processing of a second neural network.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As discussed herein, one or more embodiments of an encryption and/or decryption process are described. For example, encryption is a secure type of encoding and decryption is a secure type of decoding. An artificial intelligence (AI)-based encryption process may be provided in accordance with one or more embodiments which is at least partially based on emergent language and text translation modeling.

An "emergent language," as used herein refers a language which emerges rather than one which is acquired or already in existence. For example, a model may be trained to transform an original text message into an emergent language such as for secure transmission. For example, one or more models may be trained to transform a message which is readily perceptible to a human observer, such as "The sky is blue," into an emergent language, such as a series of symbols, numbers, and/or data points, such as "334 567 889 119." If the language is emergent or previously unknown, even if the message is intercepted after being transformed into the emergent language, content of the message may not be understood by a human or other entity which has intercepted the message. For example, within the context of cryptography, a plaintext message may be transformed into an emergent language message and may be transmitted over a network such as the Internet to a receiving entity, such as a data center or server. If the data center or server knows the emergent language, the message may be translated back into a plaintext format for subsequent processing, for example. In accordance with one or more embodiments, an emergent language may be unique to and based on a particular dataset.

An emergent language may be specific to a training process of a particular model and may be unique and customized to a particular data set. For example, given a data set such as speech, text, image, a model may be trained to provide a unique language in terms of symbols. Given input data, an AI-implemented algorithm may train an emergent language (e.g., via a public key). Given this data, numbers may be produced which are meaningless to someone who does not know the emergent language. Such number may therefore be broadcast through the internet.

A "plaintext message," as used herein, refers to a message in an unencrypted format. For example, a message prior to being encrypted may comprise a plaintext message. For example, an email communication message prior to transmission over a network such as the Internet may be in a plaintext format.

Use of an emergent language in accordance with cryptography may provide numerous advantages, e.g., in terms of data security. For example, it may be substantially more difficult to decrypt an encrypted emergent language message if the emergent language is unknown, even if quantum computers are utilized to attempt to decrypt the message. Accordingly, instead of using prime number factorization to perform encryption and/or decryption, the use of an emergent language for the encryption and/or decryption may provide significantly more security. In one particular embodiment, a first neural network may implement a first artificial intelligence trained model to transform a plaintext message into an emergent language message and a second neural network may be utilized to implement a second artificial intelligence trained model to decrypt the message from the emergent language into a plaintext message.

The use of an unknown language may be a useful basis for encryption. For example, if there was an archaic language which has disappeared, but someone somehow speaks that language, that archaic language may be used as a basis for encryption because nobody else knows that language. Accordingly, even if quantum computers are employed, such quantum computers would not be able to learn this language because it is not based on mathematical computations but is instead based on the way humans learn languages.

Given an arbitrary data type, e.g., text, image, time series, speech, an embodiment may provide a process in which AI agents may be trained to provide an emergent language. For example, an AI agent may be trained to provide a language to describe objects.

In accordance with a process of emergent language generation, two agents may comprise a sender and a receiver trained using a referential game with the goal to learn to communicate. With a sentence from a book being provided, the sender agent produces a sequence of symbols. The receiver agent is provided with a generated symbolic sequence (from the sender agent) and an original sentence, along with distracting sentences. Using reinforcement learning, both agents may be encouraged to learn to communicate, and the sender agent may attempt to generate interpretable sentences while the receiver is encouraged to match the original sentence from the symbols that the sender agent generated. By virtue of a learning process, a language may emerge with unique semantics and grammar. To recover data, a neural machine translation may learn to translate a newly generated emergent language back to the original data. Such translation may be possible given that one has access to all pairs of newly generated sentences. An end-to-end commutation may be summarized as: Data→Emergent Language Generation→Communication→Data Back-Translation where emergent language and data translation can be thought as public and private key generation.

Public-key cryptography, or asymmetric cryptography, is a cryptographic system that uses pairs of keys: public keys which may be disseminated widely, and private keys which are known only to the owner. The generation of such keys depends on cryptographic algorithms based on mathematical problems to produce one-way functions. Effective security only requires keeping the private key private; the public key can be openly distributed without compromising security. In such a system, any person may encrypt a message using the receiver's public key, but that encrypted message can only be decrypted with the receiver's private key.

Robust authentication is also possible. A sender may combine a message with a private key to create a short digital signature on the message. Anyone with the sender's corresponding public key can combine the same message and the supposed digital signature associated with it to verify whether the signature was valid, i.e. made by the owner of the corresponding private key.

Public key algorithms are fundamental security ingredients in modern cryptosystems, applications and protocols assuring the confidentiality, authenticity and non-repudiability of electronic communications and data storage. They underpin various Internet standards, such as Transport Layer Security (TLS), S/MIME, PGP, and GPG. Some public key algorithms provide key distribution and secrecy (e.g., Diffie-Hellman key exchange), some provide digital signatures (e.g., Digital Signature Algorithm), and some provide both (e.g., RSA).

The Public and Private key pair comprise of two uniquely related cryptographic keys (basically long random numbers). The Public Key is what its name suggests—Public. It is made available to everyone via a publicly accessible repository or directory. On the other hand, the Private Key must remain confidential to its respective owner.

Because the key pair is mathematically related, whatever is encrypted with a Public Key may only be decrypted by its corresponding Private Key and vice versa. For example, if Bob wants to send sensitive data to Alice, and wants to be sure that only Alice may be able to read it, he will encrypt the data with Alice's Public Key. Only Alice has access to her corresponding Private Key and as a result is the only person with the capability of decrypting the encrypted data back into its original form. As only Alice has access to her Private Key, it is possible that only Alice can decrypt the encrypted data. Even if someone else gains access to the encrypted data, it will remain confidential as they should not have access to Alice's Private Key.

Figure 1:
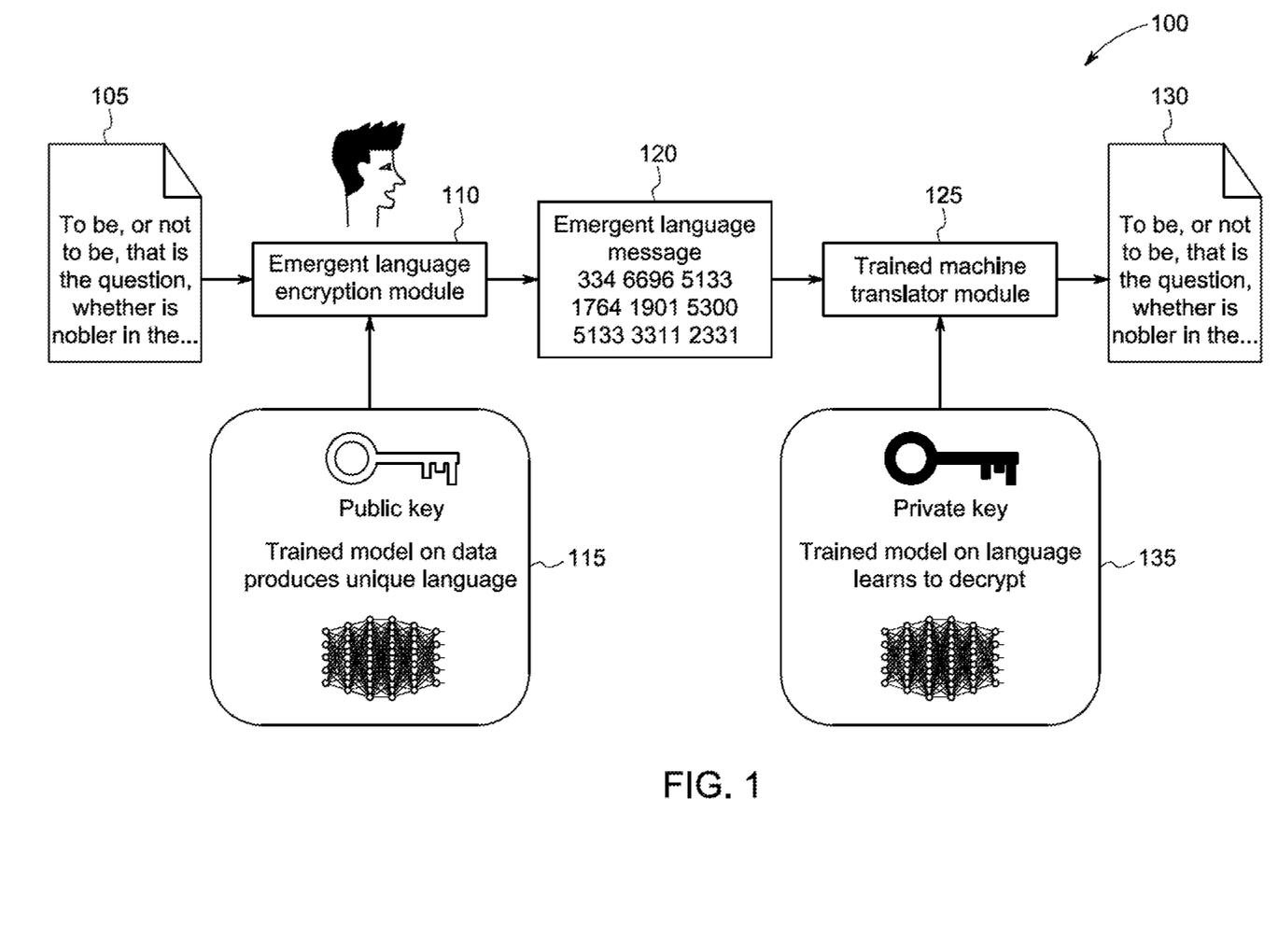
FIG. 1 illustrates an embodiment of a process for encrypting and decrypting a message via use of an emergent language.

FIG. 1 illustrates an embodiment 100 of a process for encrypting and decrypting a message via use of an emergent language. In embodiment 100, an original plaintext message 105 is acquired or obtained by an emergent language encryption module 110. In this example embodiment, the original plaintext message 105 includes the text, "To be or not to be, that is the question, whether the nobler in the . . . " Emergent language encryption module 110 may utilize a public key 115 to encrypt information of the original plaintext message 105 into an emergent language message 120. For example, public key 115 may implement a trained model on data which produces an emergent or unique language. As discussed above, the emergent language may comprise a new or unknown language and may be unique to a particular data set. Emergent language message 120 may comprise a set or series of symbols or data points. In this example embodiment, emergent language message 120 may comprise a set of numbers, "334 6696 5133 1764 1901 5300 5133 3311 2331". Accordingly, by encrypting original plaintext message 105 with public key 115, emergent language message 120 may be obtained. In accordance with an embodiment, a data center or server receiving the emergent language message 120 may need to know the emergent language in order to translate information in the emergent language message 120 back into a plaintext message format, for example.

In embodiment 100, a trained machine translation module 125 may translate the emergent language message 120 into a decrypted plaintext message 130. For example, decrypted plaintext message 130 may be identical to original plaintext message 105. Trained machine translation module 125 may utilize a private key 135 to perform the decryption of the emergent language message 120. For example, private key 135 may implement a trained model on language to learn to decrypt the emergent language message.

In embodiment 100, emergent language encryption module 110 may be implemented by or included within a computing device having a processing capability, such as a server. Trained machine translator module 125 may be implemented by or included within a different computing device, such as another server or data center, for example. Emergent language message 120 may be transmitted across a network between computing devices implementing or including emergent language encryption module 110 and trained machine translator module 125, respectively.

Public key 115 may comprise a trained model on data and may be trained via artificial intelligence via a first neural network, for example. Private key 135 may similarly comprise a trained model on data which may be trained via artificial intelligence via a second neural network, different from the first neural network. Accordingly, by using different neural networks to train the public key 115 and the private key 135, an enhanced level of security may be achieved, for example. For example, a successful attacker would need to learn the emergent language and learn the translation from the emergent language back to plaintext. The use of an emergent language in this manner may result in exponential complexity, whereby if each parameter is a float32 value, models may have millions of parameters with millions of permutations from a deep learning architecture.

There exists a grounding problem in language, such as a symbolic language. For example, a symbol grounding problem may relate to how symbols such as, e.g., words, get their meanings, and is closely related to the problem of what meaning itself really is. For example, grounding may be utilized to establish whether two agents or two humans can understand each other while they are speaking a different language. In one example, a first speaker may speak Spanish, whereas another speaker may speak English. If these two speaker want to communicate, eventually they may create a unique language, such as Spanglish, e.g., a common language which grounds the Spanish and English languages. In the context of artificial intelligence, there may be two agents which initially do not know how to communicate with each other until they learn a communication protocol.

Grounding may allow communication between two agents. For example, referential games may be utilized to establish grounding. In accordance with one particular embodiment, reinforcement-learning neural network agents may be trained on referential communication games to learn an emergent language. A "referential game," as used herein, refers to a process for communication between two agents to learn a language, such as an emergent language. In one example embodiment, there may be a collection of images from which a particular target image t is sampled or selected, as well as K distracting or distraction images. In this example, there are two agents, e.g., a sender agent and a receiver agent. After viewing target image t, the sender agent may create a message which comprises a sequence of images, one of which is the target image t and the rest of which are distracting images. Upon receiving the message, a goal of the receiver agent is to correctly identify the target image t from among the distracting images.

Grounding based on emergent languages may comprise a type of unsupervised learning. Accordingly, such a technique mat be directly applied to unlabeled data. A grounded emergent language with a finite set of symbols may be applicable to an object classification task. For example, a vocabulary "V" may be defined with a finite set of symbols as well as two agents, such as a sender agent and a receiver agent. During each iteration of an unsupervised learning process, the sender agent may randomly select an image from a large repository of images, X, and may deliver this selected image to the receiver agent. An additional number of images, such as 1000 of more images in some implementations, may also be randomly sent from the repository of images X to the receiver agent. In accordance with an embodiment, the sender agent does not know which additional images were sent and the receiver agent does not know which of the images which were received was selected and sent by the sender agent.

A goal of the receiver agent is to determine which of the received images was sent by the sender agent from among the randomly sent distracting images. To aid with this task, the sender agent is also allowed to transmit a finite expression "e" which is a sequence of symbols from "V," e.g., a kind of descriptive sentence of the transmitted image.

Using reinforcement learning, both the sender agent and the receiver agent may be rewarded if the receiver agent can accurately identify the image sent by the sender agent. Initially, symbols in "V" have no meaning, but over time both agents may develop an agreement on the interpretation of these symbols, which may be similar to nouns, verbs, adjectives and other grammatical constructs, for example. In this way, an unsupervised emergent language (EL) learning process may be viewed as form of semantic grounding which enables agent-to-agent communication (AtAC), for example.

Figure 2:
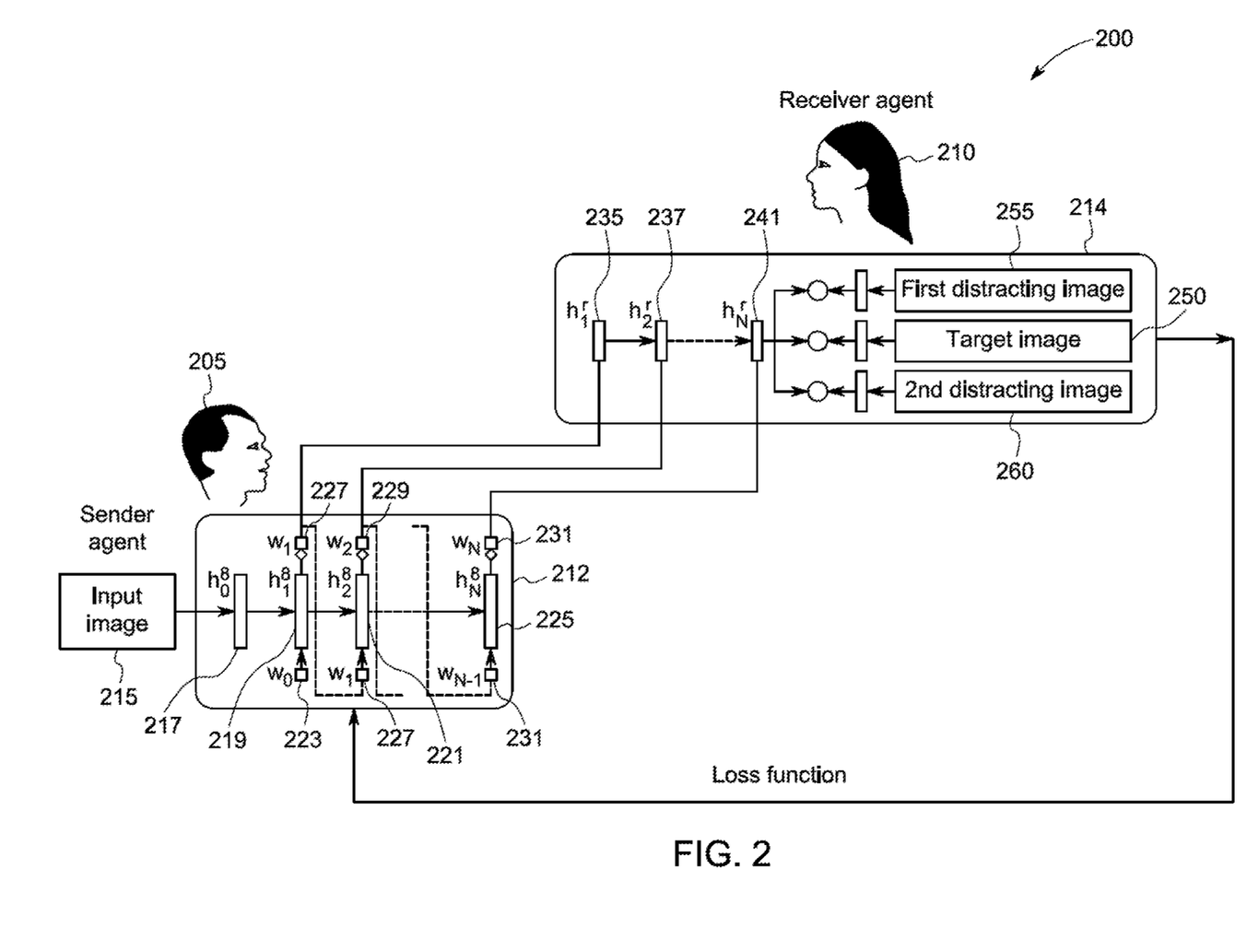
FIG. 2 illustrates an embodiment of a referential game process for training a sender agent to communicate in an emergent language with a receiver agent.

FIG. 2 illustrates an embodiment 200 of a referential game process for training a sender agent 205 to communicate in an emergent language with a receiver agent 210. In this referential game process, the sender agent 205 and the receiver agent 210 may be asked to describe images or other features, for example, such as video, text, or some other object used to derive a language. If there are hundreds of thousands of images, an image may be selected at random or approximately at random. In one example embodiment, the input image may comprise an image of a type of pizza. The sender agent 205 may build a sentence in terms of words, where each word may comprise a symbol. The receiver agent 210 may obtain the sequence of symbols and may match the sentence with a corresponding images from among many other images. The sender agent 205 may comprise a long short-term memory (LSTM) neural network 212. The receiver agent 210 may comprise its own LSTM neural network 214. An LSTM neural network may comprise an artificial recurrent neural network (RNN) architecture which may be used in the field of deep learning. Unlike standard feedforward neural networks, an LSTM neural network has feedback connections and may not only process single data points (such as images), but also entire sequences of data (such as speech or video).

In embodiment 200, given input image 215 may be provided to a first hidden sender state 217, $h_0^s$, of LSTM neural network 212. The hidden states may be obtained from the input data, e.g., the image of the pizza. Sender agent 205 may include various additional hidden states such as second hidden sender state 219, $h_1^s$, third hidden sender state 221, $h_2^s$, and additional hidden states through nth hidden sender state 231, $h_{N-1}^s$, to name just a few examples. Sender agent 205 may provide words as an output, such as $w_1$ 227, $w_2$ 229, $w_3$ 231, and $w_4$ 233, for example.

Receiver agent 210 may receive each of the words, $w_1$ 227, $w_2$ 229, and $w_N$ 231, as inputs to hidden states of its own LSTM neural network, such as first hidden receiver state 235, $h_1^r$, second hidden receiver state 237, $h_2^r$, and nth hidden receiver state 241, $h_N^r$, to name just a few examples.

A receiver agent 210 may process information obtained from its own hidden states and may attempt to select an image from a set of images which includes a target image 250 which is identical to the input image 215. The set of images also includes various distracting images which are different from the input image 215 and are included to assist in tuning the LSTM neural networks 212 and 214 of the sender agent 205 and of the receiver agent 210, respectively. In embodiment 200, the set of images may include distracting images such as first distracting image 255 and a second distracting image 260. Although only two distracting images are illustrated in FIG. 2, it should be appreciated that many additional distracting images may also be considered in accordance with some embodiments.

Embodiment 200 includes a loss function which may adjust parameters on the various hidden states, for example, until a receiver agent 210 improves its accuracy in selecting an image which matches an input image 215. If the receiver agent 210 selects an incorrect image, its LSTM neural network may penalize that incorrect answer and will encourage the sender agent 205 and the receiver agent 210 to optimize their LSTM neural networks in order to converge on the same data point, such as where an image selected by the receiver agent 210 corresponds to the input image 205. Embodiment may additionally or alternatively reward a correct answer. In accordance with an embodiment, reinforcement learning may be employed. For example, numerous iterations may be performed in accordance with embodiment 200 until the loss function is minimized such as where the receiver agent 210 maximizes or otherwise increases its accuracy in selecting images which match the input image 215.

A process in accordance with embodiment 200 may operate on continuous values. However, additional embodiments may implement processes to operate on symbolic expressions instead of continuous values. By operating on symbolic expressions, for example, semantic and grammar modes may be implemented.

When describing perceived scenes in natural language, humans effectively utilize compositional communication protocols to convey their beliefs. For example, complex descriptions such as sentences or expressions may be composed of smaller building blocks such as words or symbols, where the meaning of the whole depends on both the content and order of its parts. Some methods for language representation, such as image captioning, dialog generation, or MovieQA may focus on supervised language generation for activity recognition. One or more embodiments as discussed herein utilize structured compositional languages which may naturally emerge when artificial agents learn to communicate in referential game environments. A referential game environment, such as that shown in embodiment 200 of FIG. 2, has an advantage of integrating symbolic data interpretation and category-concept discovery. For example, if integers are used to learn an emergent language instead of the images described with respect to embodiment 200, a symbol string such as "1, 9, 7" might convey the semantic super-category of "animal, street", whereas a different symbol string, "1, 9, 7, 3, 8, 5" may further convey concept categories such as "dog, car, street light".

Figure 3:
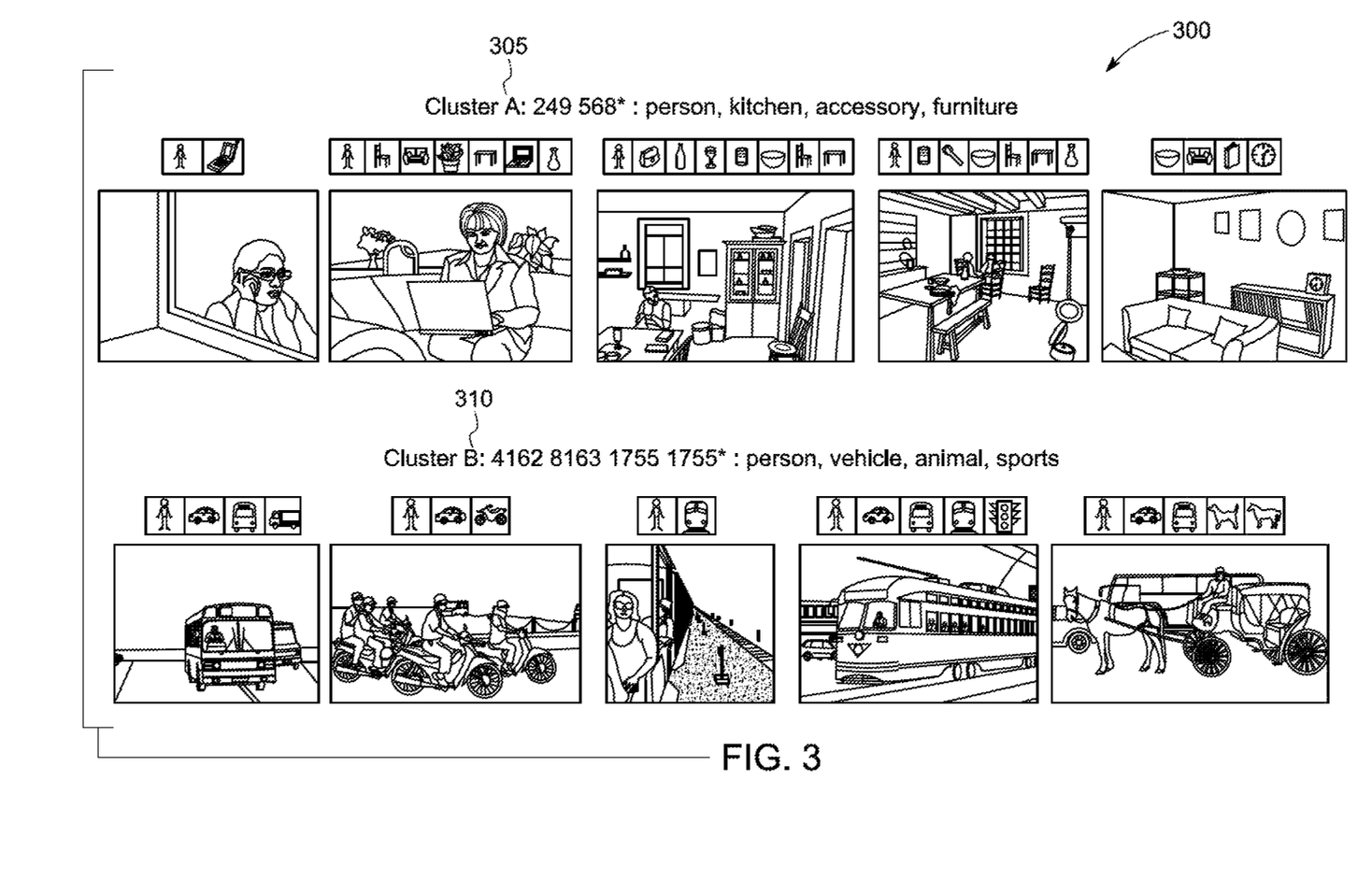
FIG. 3 illustrates an embodiment of groups of images and symbols.

FIG. 3 illustrates an embodiment 300 of groups of images and symbols. For example, embodiment 300 illustrates groups of images and symbols determined by training a sender agent and a receiver agent to learn to communicate using the a dataset with 80,000 images. In this example, an 95% accuracy is achieved in agent communication between the sender agent and the receiver agent, although it should be appreciated that a different, such as a higher, level of accuracy may be achieved in accordance with certain implementations, such as those using different source images. In this example, a language was learned which comprised 10,000 symbols and sentences of length 10.

Unsupervised clustering applied to 80,000 sentences in this example embodiment, e.g., generated from the respective images, and an associated the respective Common Objects in Context (COCO) data anthological super-class model. FIG. 3 illustrates two representative clusters, e.g., Cluster A 305 and Cluster B 310. For example, Cluster A may be composed of the first two symbols "249 568," whereas Cluster B 310 may be composted the first four symbols "4162 8163 1755 1755," respectively. For example, as a result of unsupervised learning between a sender agent and a receiver agent, a determination may be made that Cluster A 305 is related to a super-category of person, kitchen, accessories, and/or furniture, whereas Cluster B 310 is related to a super-category of person, vehicle, animal, and/or sports. In other words, each image shown in Cluster A 305 may be related to a category of a person, kitchen, accessories, and/or furniture. Similarly, each image shown in Cluster B 310 may be related to a category of a person, vehicle, animal, and/or sports.

The results shown in FIG. 3 illustrate the feasibility for direct data interpretation using a symbolic language. Unlike other image-based classification methods, for example, complex embedding may be utilized for data scalability and adaptation. It should be appreciated that similar results may be determined from a dataset of images smaller than 80,000, such as a dataset comprising only a few thousand, or fewer, images, for example.

In accordance with one or more embodiments, by performing a process comprising a referential game, a neural network of a sender agent and/or of a receiver agent may develop a vocabulary based on various symbols, such as a vocabulary shown in FIG. 3, where various combinations of symbols may correspond to different images. Accordingly, a hierarchy of symbols may be determined or otherwise employed where an order of symbols has a particular meaning. For example, symbols may be associated with data points. Every data point might have a different representation of symbols. This may be considered a process of providing a language which is not interpretable by humans. Referential games may be used with AI agents employed as a part of an encryption process.

Figure 4:
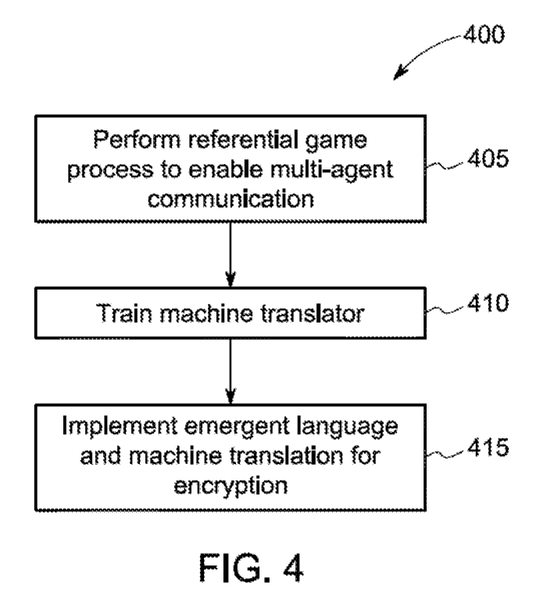
FIG. 4 illustrates an embodiment of a process for generating and implementing an emergent language for encryption.

FIG. 4 illustrates an embodiment 400 of a process for generating and implementing an emergent language for encryption. At operation 405, a referential game process may be performed to enable multi-agent communication, such as between artificial intelligence agents located on a network. For example, the referential game process may be performed to learn an emergent language between the agents. At operation 410, a machine translator may be trained to convert expressions of symbols into a human language which may be readily interpreted by a human observer. For example, a machine translator may convert or transform expressions of symbols within an emergent language into an English language or plaintext expression. At operation 415, an emergent language and machine translation process may be implemented for encryption. For example, at operation 415, a data series may be converted by a sender agent into an emergent language expression for transmission across a network and a receiver agent may transform the emergent language expression into a human language expression.

Figure 5A:
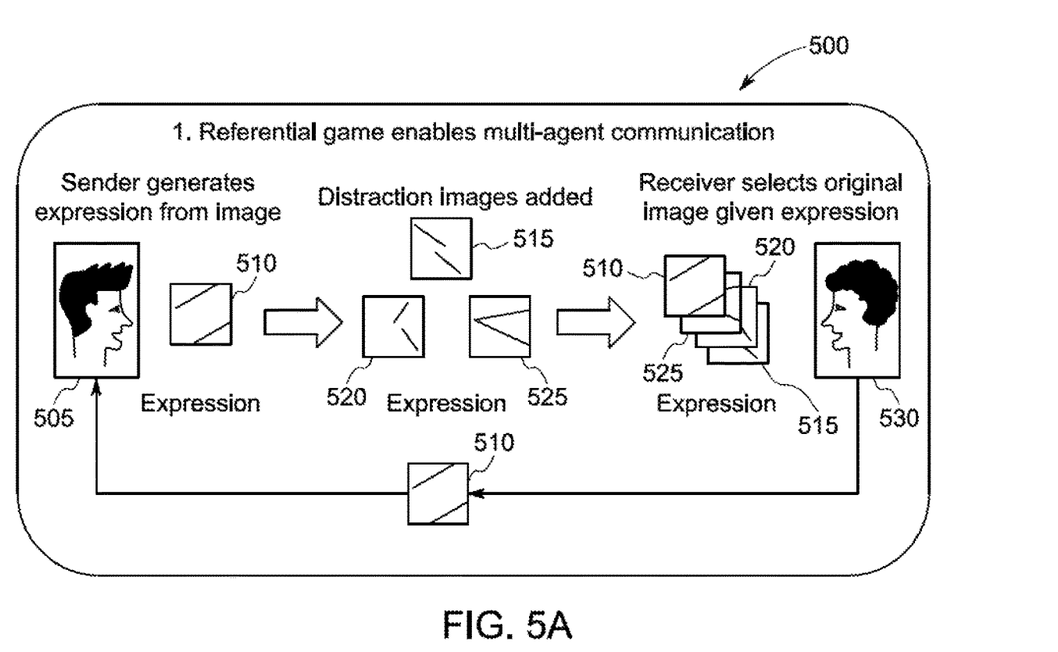
FIG. 5A illustrates an embodiment of a process for implementing a referential game to enable multi-agent communication to learn an emergent language.

FIG. 5A illustrates an embodiment 500 of a process for implementing a referential game to enable multi-agent communication to learn an emergent language. For example, a process in accordance with embodiment 500 may be utilized to perform operation 405 of embodiment 400 as shown in FIG. 4. In embodiment 500, one or more symbols may be produced based on time series data. For example, a symbol in this example may comprise an image. For example, a sender agent may obtain an input image 510 produced based on time series data. In other words, input image 510 may comprise an image which corresponds to an observation of a time series of data. In one particular embodiment, a time series of data may be generated which corresponds to status messages for an industrial asset, such as a commercial windmill. For example, a unique input image 510 may be generated which corresponds to a particular time series of data. In one example, a matrix of time series data may be utilized to generate or produce one or more corresponding images such as input image 510. Distraction images 515, 520, and 525 also may be generated or otherwise obtained. The input image 510 and the distraction images 515, 520, and 525 may be transmitted to a receiver agent 530. The receiver agent 530 may select among the received images during a training process and the selected image may be returned to the sender agent 505. Sender agent 505 may comprise an AI agent and may utilize an LSTM neural network. Receiver agent 510 may likewise comprise an AI agent and may utilize its own LSTM neural network. A reinforcement learning process may be employed so that if the correct image is selected, such as input image 510, a reward is provided to an LSTM neural network of the receiver agent 530 and/or of the sender agent 505. On the other hand, if one of the distraction images is incorrectly selected by the sender agent 505, a penalty may be assessed to the LSTM neural network of the receiver agent 530 and/or of the sender agent 505.

A human sentence may correspond to each observation of time series data. It should be appreciated that there are other ways of training besides referential games.

Figure 5B:
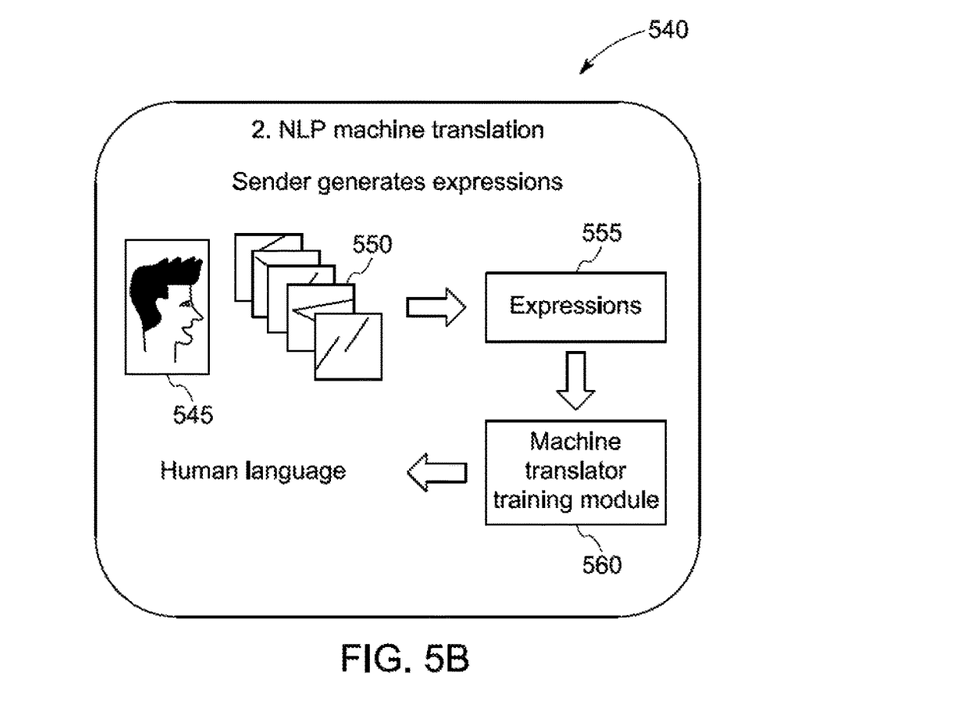
FIG. 5B illustrates an embodiment of a process for translating expressions in an emergent language into human language.

FIG. 5B illustrates an embodiment 540 of a process for translating expressions in an emergent language into human language. For example, embodiment 540 may implement a natural language processing (NLP) machine translation between an emergent language to a human language, such as the English language. In embodiment 540, an agent 545 may select various symbols 550 to generate expression 555 of the symbols. For example, each of the symbols may comprise a representation of time series data, as discussed above. The symbols 550 may be arranged in a particular order to generate expressions 555 which have a semantic meaning such as within an emergent language, for example. The expressions 555 may be provided to a machine translator training module 560, which may server to convert the expressions 555 from the emergent language into a particular human language, such as the English language. For example, machine translator training module 560 may comprise a neural network, such as a 2-layer LSTM neural network, such as one having 500 hidden units and comprising an encoder/decoder in accordance with a particular embodiment. For every time series data, there is a corresponding human-perceivable sentence or expression describing that time series data. In embodiment 540, the goal is to determine the human sentence or expression which corresponds to the expression of symbols corresponding to the time series data. The human language represents the interpretability of the data. They have semantics and grammar. The symbols represent a language with semantics. An AI algorithm may be used to translate into human language and my provide a way of converting data into an emergent language which has no interpretability. An algorithm may later convert that language into something a human could interpret.

Figure 6:
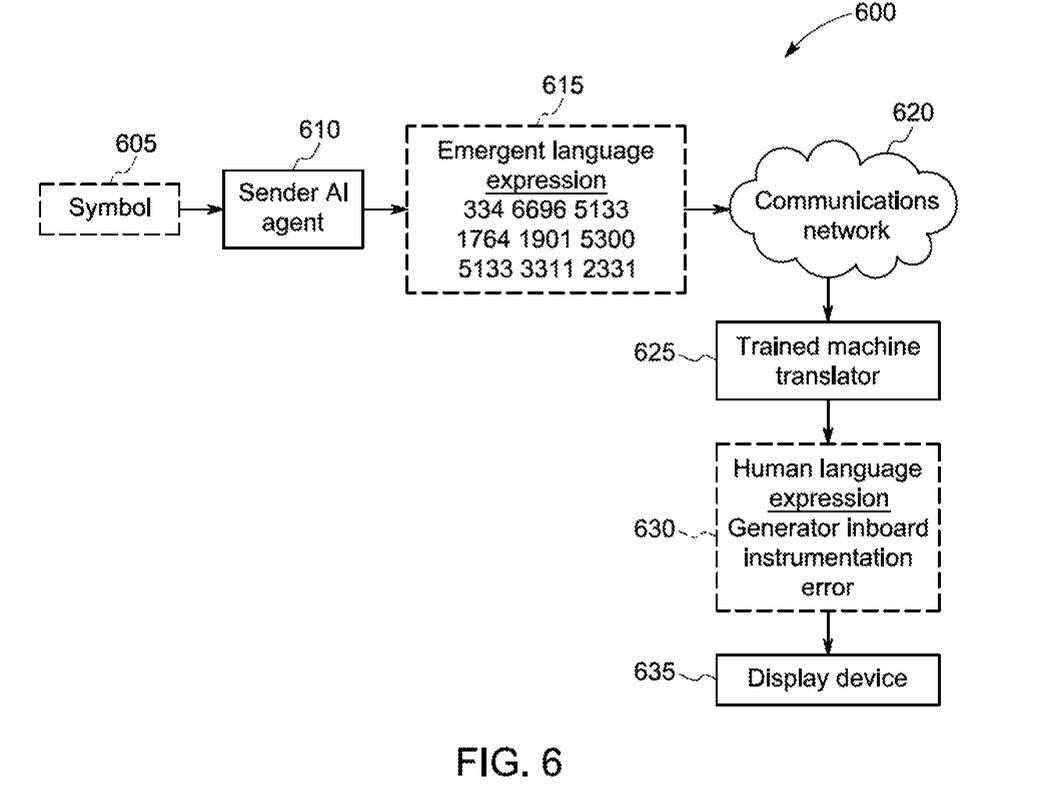
FIG. 6 illustrates an embodiment of a system for converting a symbol into a human language expression.

FIG. 6 illustrates an embodiment 600 of a system for converting a symbol into a representation of data, such as a human language expression. A symbol 605 may be received by a sender AI agent 610. For example, as discussed previously above, an observation of a time series data may be represented as a symbol such as an image. Sender AI agent 610 may comprise a neural network. Sender AI agent 610 may be trained to know how to transform the symbol 605 into an emergent language expression 615. In this example embodiment, the symbol 605 may be transformed into an emergent language expression comprising integers, "334 6696 5133 1764 1901 5300 5133 3311 2331". Such an emergent language expression 615 may not be understandable by a human observer or by a computing device which may intercept the emergent language expression 615 if, e.g., the computing device does not know the emergent language or semantics thereof. Emergent language expression 615 may be transmitted across a network 620 such as the Internet, for example. Emergent language expression 615 may be received by a trained machine translator 625 which may have already be trained to translate an expression in an emergent language into an expression which is understandable by a human observer, such as a plaintext message. For example, trained machine translator 625 mat translate emergent language expression 615 into human language expression 630. In this example embodiment, human language expression may comprise a text expression in English language such as "Generator Inboard Instrumentation Error." The human language expression 630 may be presented to a human operator via a display device, such as a monitor display. The human language expression 630 may be presented via an audible alarm in accordance with some embodiments.

Figure 7:
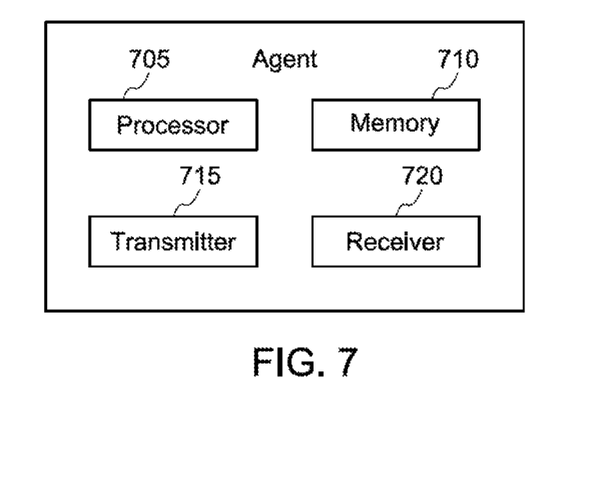
FIG. 7 illustrates an agent according to an embodiment.

FIG. 7 illustrates an agent 700 according to an embodiment. For example, agent 700 may comprise a sender agent or a receiver agent. Agent 700 may include a processor 705, a memory 710, a transmitter 715, and a receiver 720, to name just a few example components among many possibilities. For example, processor 705 may, for example, execute program code or instructions stored in memory 710 to process signals received by receiver 720 and/or to generate signals to be transmitted via transmitter 715, such as to learn an emergent language via communications with another agent.

A way of encrypting and decrypting data as discussed here may be based on a model which is not reliant on just prime number factorization or some other mathematical basis. By using symbols as a proxy in the Internet, a message in an emergent language format would be very difficult to crack if one doesn't have access to the data or the network. Such a model may contain potentially millions of parameters. In order to produce symbols from such a data set, one would have to make almost an infinite number of attempts on the data. Since there are many different ways of doing the architecture, e.g., it would be incredibly difficulty to crack the data and therefore results in a higher level of security.

A translator/decrypter may be implemented as a neural network. Such a translator may know to translate a symbolic language into sentences. Someone would have to crack both the public key and the private key, e.g. two neural networks, in order to crack. These neural networks may be trained differently, so they are not correlated. Accordingly, a much higher level of security may therefore be provided.

Text or voice may be encrypted into an emergent language such that they would have the same representation. In other words, one may use the same symbols to encrypt different data types to add another layer of complexity. Such encryption is not based on prime number or elliptical curve-based approaches and may be unique to a particular data set.

As will be appreciated based on the foregoing specification, one or more aspects of the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A system for secure communication, comprising:
   a trained agent to acquire a symbol comprising a representation of input data, convert the symbol into an emergent language expression in an emergent language via processing of a first neural network, and initiate transmission of the emergent language expression over a communications network, wherein the emergent language comprises a language based on and specific to the input data, wherein the first neural network is to generate the emergent language which is a new language that is not in existence that is used to represent the input data, wherein the emergent language is not based on a prime number factorization technique;
   a trained machine translator to receive the emergent language expression via the communications network and translate the emergent language expression into the input data via processing of a second neural network.

2. The system of claim 1, wherein the symbol comprises an image or a snippet of audio comprising the representation of the input data.

3. The system of claim 1, wherein the input data comprises information indicating a status of an industrial asset.

4. The system of claim 1, wherein the input data comprises a human language expression.

5. The system of claim 1, further comprising an input agent to convert the input data into the symbol.

6. The system of claim 1, wherein the trained machine translator is to translate the emergent language expression based on semantics of the symbol.

7. A method for secure communication, comprising:
   acquiring a symbol comprising a representation of input data;
   converting the symbol into an emergent language expression in an emergent language via processing of a first neural network, wherein the first neural network generates the emergent language which is a new language that is not in existence that is used to represent the input data;
   initiating transmission of the emergent language expression over a communications network, wherein the emergent language comprises a language based on and specific to the input data;
   translating the emergent language expression into the representation of input data via processing of a second neural network.

8. The method of claim 7, further comprising presenting a human language expression on a display device.

9. The method of claim 7, wherein at least one of the first and second neural networks comprises a long short-term memory (LSTM) neural network.

10. The method of claim 7, wherein the symbol comprises an image or a snippet of audio comprising the representation of the input data.

11. The method of claim 7, wherein the input data comprises information indicating a status of an industrial asset.

12. The method of claim 7, wherein the translating of the emergent language expression is based on semantics of the symbol.

13. An article, comprising:
a non-transitory storage medium comprising machine-readable instructions executable by one or more processors to:
- acquire a symbol comprising a representation of input data;
- convert the symbol into an emergent language expression in an emergent language via processing of a first neural network, wherein the first neural network generates the emergent language which is a new language that is not in existence that is used to represent the input data;
- initiating transmission of the emergent language expression over a communications network, wherein the emergent language comprises a language based on and specific to the input data;
- translate the emergent language expression into the representation of input data expression via processing of a second neural network.

14. The article of claim 13, wherein the machine-readable instructions are further executable by the one or more processors to initiate presentation of a human language expression on a display device.

15. The article of claim 13, wherein at least one of the first and second neural networks comprises a long short-term memory (LSTM) neural network.

16. The article of claim 13, wherein the symbol comprises an image or a snippet of audio comprising the representation of the input data.

17. The article of claim 13, wherein the input data comprises information indicating a status of an industrial asset.

18. The article of claim 13, wherein the input data comprises a human language expression.

19. The article of claim 13, wherein the machine-readable instructions are further executable by the one or more processors to convert the input data into the symbol.

20. The article of claim 13, wherein the machine-readable instructions are further executable by the one or more processors to translate the emergent language expression based on semantics of the symbol.

\* \* \* \* \*